(12) United States Patent
Diatzikis et al.

(10) Patent No.: US 9,548,642 B2
(45) Date of Patent: Jan. 17, 2017

(54) FIBER OPTIC SENSING APPARATUS FOR DETECTING STATOR SLOT TEMPERATURES AND STATOR INCLUDING SUCH APPARATUS

(71) Applicant: Siemens Energy, Inc., Orlando, FL (US)

(72) Inventors: Evangelos V. Diatzikis, Chuluota, FL (US); Luis Alberto de Almeida Ferreira, Vila Nova de Gaia (PT); Francisco Manuel Moita Araujo, Matosinhos (PT)

(73) Assignee: SIEMENS ENERGY, INC., Orlando, FL (US)

( * ) Notice: Subject to any disclaimer, the term of this patent is extended or adjusted under 35 U.S.C. 154(b) by 416 days.

(21) Appl. No.: 14/242,148

(22) Filed: Apr. 1, 2014

(65) Prior Publication Data
US 2015/0280530 A1    Oct. 1, 2015

(51) Int. Cl.
*H02K 11/00* (2016.01)

(52) U.S. Cl.
CPC ........... *H02K 11/0047* (2013.01); *H02K 11/25* (2016.01)

(58) Field of Classification Search
CPC .......... G01J 5/0096; G01J 5/08; G01J 5/0821; G01K 11/32; G01K 11/22; G01K 11/3206; G01K 11/02; G01K 1/024; G01K 5/52; G01K 1/14; B32B 7/02; B32B 1/00; B32B 1/08; G02B 6/00; G01D 5/35358; G01D 5/35383; H02K 11/22; H02K 11/20; G01B 11/14

USPC ....................... 310/214, 215, 68 C
See application file for complete search history.

(56) References Cited

U.S. PATENT DOCUMENTS

| | | | | |
|---|---|---|---|---|
| 4,676,665 A * | 6/1987 | Twerdochlib | .......... | G01K 11/02 374/117 |
| 4,827,487 A * | 5/1989 | Twerdochlib | ......... | G01J 5/0096 310/338 |
| 6,886,977 B2 * | 5/2005 | Kaminski | ............... | G01K 11/32 250/227.14 |
| 6,888,124 B1 | 5/2005 | Smith | | |
| 8,076,909 B2 | 12/2011 | Diatzikis et al. | | |
| 2002/0196994 A1 * | 12/2002 | Bosselmann | .......... | G01B 11/14 385/12 |
| 2010/0089159 A1 * | 4/2010 | Younsi | .................... | G01P 1/023 73/514.32 |
| 2012/0279313 A1 * | 11/2012 | Diatzikis | ................... | G01P 5/02 73/861 |

* cited by examiner

*Primary Examiner* — Naishadh Desai

(57) ABSTRACT

A sensing apparatus (20) based on fiber optics including fiber gratings for monitoring stator slot temperatures in an electromotive machine (10) is provided. The apparatus may include a dielectric strip (22) to be received in a gap between a first stator bar (16) and a second stator bar (18) in a stator slot (14). One or more optical fibers (24, 25) may be disposed in the dielectric strip and extend along a longitudinal axis of the dielectric strip. A plurality of sites 28 in the optical fiber include a respective fiber Bragg grating arranged to have a respective optical response in a wavelength spectrum indicative of a value of temperature at the grating site.

20 Claims, 3 Drawing Sheets

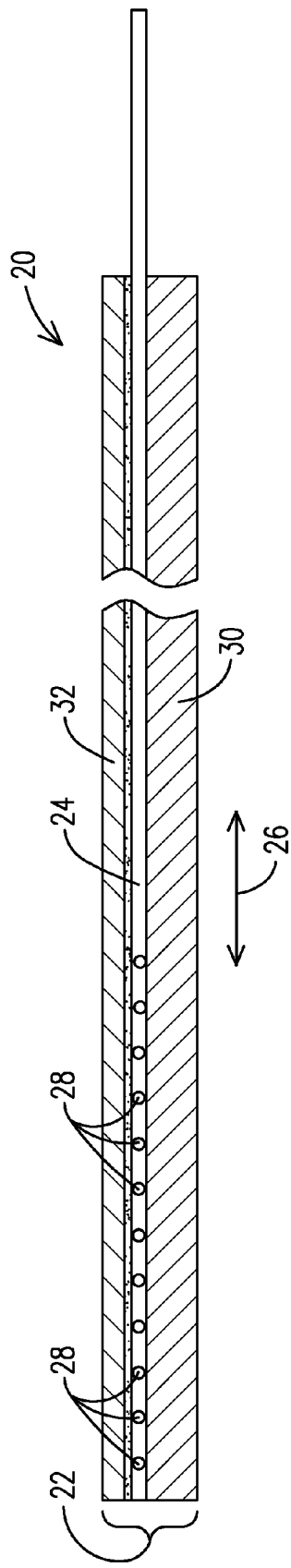
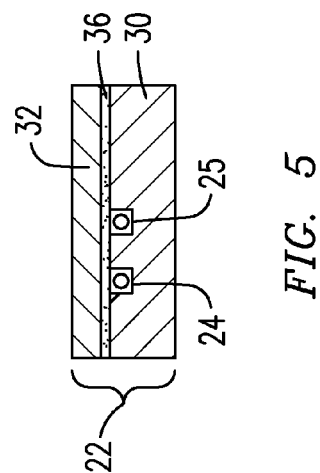
FIG. 3
FIG. 4
FIG. 5

US 9,548,642 B2

FIBER OPTIC SENSING APPARATUS FOR DETECTING STATOR SLOT TEMPERATURES AND STATOR INCLUDING SUCH APPARATUS

FIELD OF THE INVENTION

Aspects of the present invention relate generally to fiber optic sensing, and, more particularly, to a sensing apparatus based on fiber optics including fiber gratings for monitoring stator slot temperatures in an electromotive machine.

BACKGROUND OF THE INVENTION

An electromotive machine, such as a large electrical generator as may be used in the field of electrical power generation or a motor, includes a stator winding having a large number of conductors or stator bars that are pressed into slots in a base body, such as a laminated stator core. Such a machine represents a very expensive and long-term investment. For example, a failure of the generator not only endangers the power equipment itself but may also result in substantially costly and burdensome service reduction due to the down time associated with a repair. Cost-effective, reliable and accurate monitoring of stator slot temperatures is desirable for timely and systematic prevention of malfunctions. For example, this monitoring may be desirable for determining the operational condition of the machine and/or for analyzing the design of the stator bars. Disclosed embodiments are believed to successfully address at least such needs.

BRIEF DESCRIPTION OF THE DRAWINGS

The invention is explained in the following description in view of the drawings that show:

FIG. 3 is a side cross-sectional view of one non-limiting embodiment of a fiber optic sensing apparatus comprising first and second dielectric strips.

FIG. 4 is an elevational cross-sectional view depicting grooves in one of the dielectric strips for the fiber optic sensing apparatus shown in FIG. 3.

FIG. 5 is an end view of the fiber optic sensing apparatus shown in FIG. 3.

DETAILED DESCRIPTION OF THE INVENTION

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent unless otherwise so described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
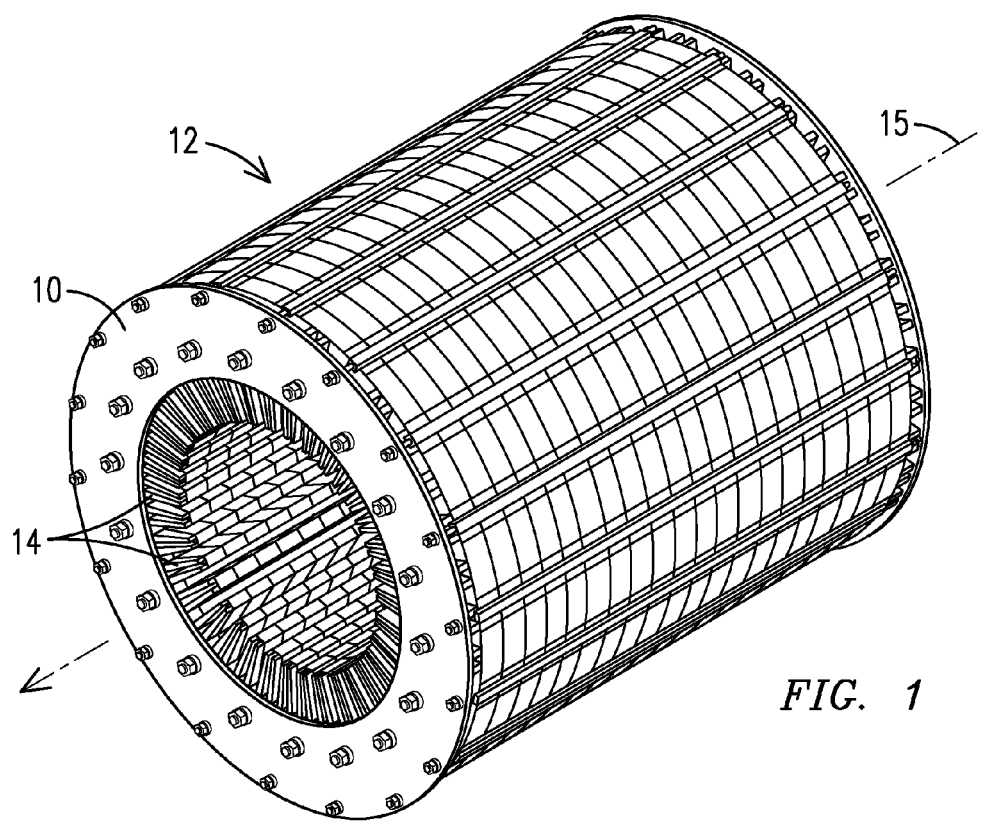
FIG. 1 is an isometric view of a stator of an electromotive machine that may benefit from a fiber optic sensing apparatus embodying aspects of the present invention.

FIG. 1 is an isometric view of a stator 10 of an electromotive machine 12, such as a power generator or an electric motor that may benefit from a fiber optic sensing apparatus embodying aspects of the present invention. Stator 10 includes a plurality of stator slots 14 circumferentially disposed about a longitudinal axis 15 of stator 10. Stator slots 14 may be configured for receiving stator bars, as may be appreciated in FIG. 2.

Figure 2:
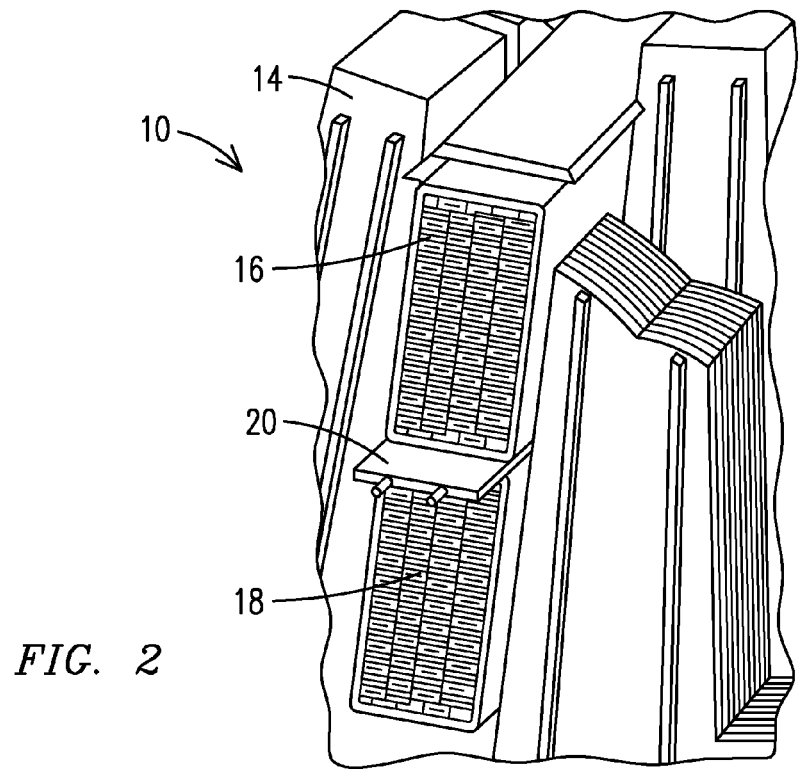
FIG. 2 is a partial isometric view of a stator illustrating a stator slot including a fiber optic sensing apparatus embodying aspects of the present invention.

FIG. 2 is a partial isometric view of stator 10 illustrating a stator slot 14 configured to receive at least a first stator bar 16 and a second stator bar 18 having a gap (e.g., a discontinuity) between one another. In accordance with aspect of the present invention this gap between first stator bar 16 and second stator bar 18 receives a fiber optic sensing apparatus 20 embodying aspects of the present invention.

FIG. 3 is a side cross-sectional view of one non-limiting embodiment of fiber optic sensing apparatus 20 including a dielectric strip 22 to be received in the gap between first stator bar 16 and second stator bar 18 in stator slot 14 (FIG. 2). In one non-limiting embodiment, dielectric strip 22 may comprise a fiberglass laminate material, such as National Electrical Manufacturers Association (NEMA) G11 fiberglass material effective to provide substantial mechanical strength including high dimensional stability and high dielectric strength at elevated temperatures. It will be appreciated that other materials (such as high performance resins, epoxies, laminated thermoset plastics, etc.) may be used for dielectric strip 22 provided such materials appropriately meet the mechanical and electrical requirements at the expected temperatures.

One or more optical fibers 24, 25 (FIG. 5) may be disposed in dielectric strip 22 and may extend along a longitudinal axis 26 of dielectric strip 22. A plurality of sites 28 in optical fibers 24, 25 comprise respective fiber gratings, such as respective fiber Bragg gratings, arranged to have a respective optical response in a wavelength spectrum indicative of a value of temperature at the grating site. That is, apparatus 20 is a multi-point temperature sensing device.

In one non-limiting embodiment, as may be appreciated in FIG. 5, dielectric strip 22 comprises a first dielectric strip 30 and a second dielectric strip 32, and optical fibers 24, 25 may be disposed between first and second dielectric strips 30, 32. As may be appreciated in FIG. 4 at least one of the first and second dielectric strips may comprise grooves 34, 35 to receive optical fibers 24, 25. In one non-limiting embodiment, an adhesive layer 36 (FIG. 5) may be used to adhere optical fibers 24, 25 and first and second dielectric strips 30, 32.

Figure 6:
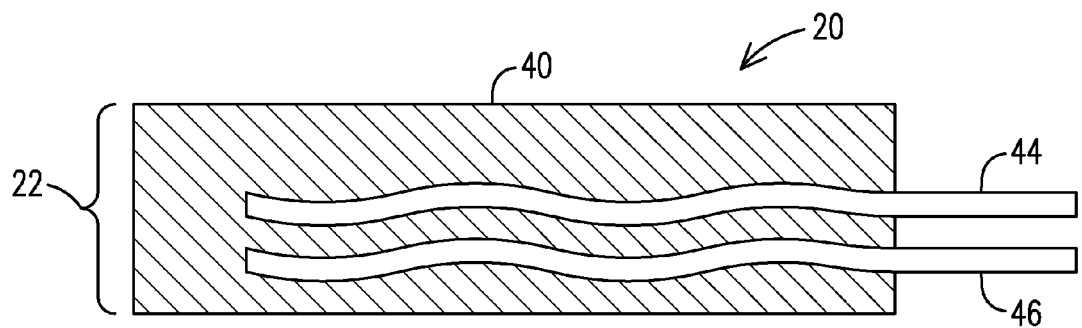
FIG. 6 is a top cross-sectional view of one non-limiting embodiment of a fiber optic sensing apparatus comprising a singular dielectric strip.
Figure 7:
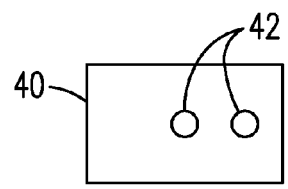
FIG. 7 is an end view of the fiber optic sensing apparatus shown in FIG. 6.
Figure 8:
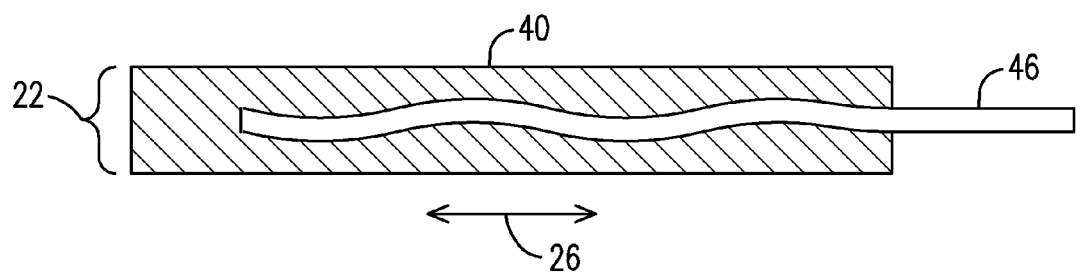
FIG. 8 is a side cross-sectional view of one non-limiting embodiment of the fiber optic sensing apparatus shown in FIG. 6.

In one non-limiting embodiment, as may be appreciated in FIGS. 6-8, the dielectric strip that encapsulates the optical fibers may comprise a singular dielectric strip 40 including respective bores 42 that may be drilled or otherwise constructed in strip 40 to receive optical fibers 44, 46. In one non-limiting embodiment, at least one of optical fibers 44, 46 may define a respective serpentine path along the longitudinal axis 26 of dielectric strip 22. It will be appreciated that optical fibers 44, 46 (24, 25) in dielectric strip 22 may have any desired spatial arrangement with respect to one another. For example, a first of such optical fibers may extend along a center line of the stator slot and a second fiber may extend parallel to the first but offset along the width or radial direction of the slot. In one non-limiting application, a given rotor slot included a dielectric strip containing two optical fibers, where each of the fibers in turn included seven fiber gratings for a total of 14 temperature sensing locations in a given stator slot. It will be appreciated that the placement of each grating site along the length of the optical fiber can be selected based on the needs of a given sensing application. It will be further appreciated that the number of grating sites that may be formed along the length of the fiber can also be selected based on the needs of a given sensing application provided one appropriately meets the spectral bandwidth of each grating site and provides a sufficient physical spacing between each grating site.

In operation, the one or more optical fibers that can be embedded in the dielectric strip between the stator bars provide substantial capability for multi-site temperature monitoring, such as three-dimensional temperature mapping relative to the longitudinal axis of the rotor slot, the radial direction and the width of the slot.

In operation, a fiber optic sensing apparatus embodying aspects of the present invention provides substantial advantages over conventional techniques that utilize resistance temperature detectors (RTDs), which involve metallic transducers and connecting leads. As will be appreciated by those skilled in the art, such metallic structures are not well suited for use in the high electromagnetic environment of an electromotive machine and can result in a high failure rate during qualification (e.g., Hi-Potential) testing of the machine. Moreover, RTDs can experience fast aging that cause the signal from the transducer element to degrade and this degradation may be further aggravated by the fact that the connecting leads of the RTD act as antennae and pick up electrical noise from the surrounding electromagnetic fields. Lastly, slot RTD sensors are limited to just one RTD element per slot, which in turn limits the measurement capability to just one point location along the length of the slot. Typically, the slots are several feet long and the temperature is not constant along the length of the slot.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus comprising:
a dielectric strip to be received in a gap between a first stator bar and a second stator bar in a stator slot, and
an optical fiber disposed in the dielectric strip and extending along a longitudinal axis of the dielectric strip, a plurality of sites in the optical fiber comprising a respective fiber Bragg grating arranged to have a respective optical response in a wavelength spectrum indicative of a value of temperature at the grating site.

2. The apparatus of claim 1, wherein the dielectric strip comprises a first dielectric strip and a second dielectric strip, the optical fiber disposed between the first and second dielectric strips.

3. The apparatus of claim 2, wherein at least one of the first and second dielectric strips comprises a groove to receive the optical fiber.

4. The apparatus of claim 3, further comprising an adhesive layer to bond the optical fiber and the first and second dielectric strips.

5. The apparatus of claim 1, wherein the dielectric strip comprises a singular strip including a bore to receive the optical fiber.

6. The apparatus of claim 1, wherein the optical fiber extends linearly along the longitudinal axis of the dielectric strip.

7. The apparatus of claim 1, wherein the optical fiber defines a serpentine path along the longitudinal axis of the dielectric strip.

8. The apparatus of claim 1, comprising at least a further optical fiber disposed in the dielectric strip.

9. The apparatus of claim 8, wherein the optical fiber and the further optical fiber in the dielectric strip have a predefined spatial arrangement with respect to one another to provide a predefined temperature mapping of the gap between the first stator bar and the second stator bar.

10. A stator comprising:
a stator slot configured to receive at least a first stator bar and a second stator bar having a gap between one another,
a dielectric strip interposed in the gap between the first and second stator bars; and
an optical fiber disposed in the dielectric strip and extending along a longitudinal axis of the stator.

11. The stator of claim 10, wherein the optical fiber comprises a plurality of sites in the optical fiber comprising a respective fiber Bragg grating arranged to have a respective optical response in a wavelength spectrum indicative of a value of temperature at the grating site.

12. The stator of claim 10, wherein the dielectric strip comprises a first dielectric strip and a second dielectric strip, the optical fiber disposed between the first and second dielectric strips.

13. The stator of claim 12, wherein at least one of the first and second dielectric strips comprises a groove to receive the optical fiber.

14. The stator of claim 10, wherein the dielectric strip comprises a singular strip including a bore to receive the optical fiber.

15. The stator of claim 10, wherein the optical fiber extends linearly along the longitudinal axis of the stator.

16. The stator of claim 10, wherein the optical fiber defines a serpentine path along the longitudinal axis of the stator.

17. The stator of claim 10, comprising at least a further optical fiber disposed in the dielectric strip.

18. The stator of claim 10, comprising a plurality of stator slots circumferentially disposed about the longitudinal axis of the stator, wherein at least some of the plurality of stator slots have respective dielectric strips with respective optical fibers disposed in the dielectric strip.

19. An electromotive machine comprising the stator of claim 10.

20. The electromotive machine of claim 19, wherein the electromotive machine comprises a generator or a motor.

* * * * *